US012034751B2

(12) United States Patent
Borges

(10) Patent No.: US 12,034,751 B2
(45) Date of Patent: Jul. 9, 2024

(54) SYSTEMS AND METHODS FOR DETECTING MALICIOUS HANDS-ON-KEYBOARD ACTIVITY VIA MACHINE LEARNING

(71) Applicant: Secureworks Corp., Wilmington, DE (US)

(72) Inventor: Nash Borges, Ellicott City, MD (US)

(73) Assignee: Secureworks Corp., Wilmington, DE (US)

(*) Notice: Subject to any disclaimer, the term of this patent is extended or adjusted under 35 U.S.C. 154(b) by 365 days.

(21) Appl. No.: 17/491,575

(22) Filed: Oct. 1, 2021

(65) Prior Publication Data

US 2023/0105087 A1 Apr. 6, 2023

(51) Int. Cl.
*H04L 29/06* (2006.01)
*G06N 20/20* (2019.01)
*H04L 9/40* (2022.01)

(52) U.S. Cl.
CPC ......... *H04L 63/1425* (2013.01); *G06N 20/20* (2019.01)

(58) Field of Classification Search
CPC ............................ H04L 63/1425; G06N 20/20
See application file for complete search history.

(56) References Cited

U.S. PATENT DOCUMENTS

| | | |
|---|---|---|
| 5,937,066 A | 8/1999 | Gennaro et al. |
| 6,357,010 B1 | 3/2002 | Viets et al. |
| 7,269,578 B2 | 9/2007 | Sweeney |
| 7,331,061 B1 | 2/2008 | Ramsey et al. |
| 7,492,957 B1 | 2/2009 | Bonhaus |
| 7,548,932 B2 | 6/2009 | Horvitz et al. |
| 7,555,482 B2 | 6/2009 | Korkus |
| 7,571,474 B2 | 8/2009 | Ross et al. |
| 7,594,270 B2 | 9/2009 | Church et al. |
| 7,606,801 B2 | 10/2009 | Faitelson et al. |

(Continued)

FOREIGN PATENT DOCUMENTS

| | | | |
|---|---|---|---|
| EP | 3599753 A1 | 1/2020 | |
| RU | 2738344 C1 * | 12/2020 | ............. G06F 21/53 |

(Continued)

OTHER PUBLICATIONS

International Search Report and the Written Opinion of the International Search Authority for PCT/US21/54090, mailed Jan. 27, 2022.

(Continued)

*Primary Examiner* — Ka Shan Choy
(74) *Attorney, Agent, or Firm* — Womble Bond Dickinson (US) LLP

(57) ABSTRACT

A method for detecting unauthorized and/or malicious hands-on-keyboard activity in an information handling system derived from the telemetry from one or more client systems, tokenizing a plurality of partial values/idiosyncrasies detected in the telemetry to form a plurality of tokens, aggregating the plurality of tokens or features over a selected time window to at least partially develop an aggregate feature vector, submitting the aggregate feature vector to one or more machine learning subsystems, and applying an ensemble model to one or more outputs from the one or more machine learning subsystems to generate an overall behavioral threat score of the potentially malicious hands-on-keyboard activity.

27 Claims, 7 Drawing Sheets

(56) References Cited

U.S. PATENT DOCUMENTS

| | | |
|---|---|---|
| 7,613,722 B2 | 11/2009 | Horvitz et al. |
| 7,770,031 B2 | 8/2010 | MacKay et al. |
| 7,841,008 B1 | 11/2010 | Cole |
| 7,856,411 B2 | 12/2010 | Darr |
| 7,926,113 B1 | 4/2011 | Gula et al. |
| 8,037,529 B1 | 10/2011 | Chiueh |
| 8,079,081 B1 | 12/2011 | Lavrik et al. |
| 8,082,506 B1 | 12/2011 | McConnell |
| 8,122,495 B2 | 2/2012 | Ramsey et al. |
| 8,156,553 B1 | 4/2012 | Church et al. |
| 8,327,419 B1 | 12/2012 | Korablev et al. |
| 8,407,335 B1 | 3/2013 | Church et al. |
| 8,490,193 B2 | 7/2013 | Sarraute et al. |
| 8,490,196 B2 | 7/2013 | Lucangeli et al. |
| 8,522,350 B2 | 8/2013 | Davenport et al. |
| 8,539,575 B2 | 9/2013 | Schmitlin et al. |
| 8,578,393 B1 | 11/2013 | Fisher |
| 8,595,170 B2 | 11/2013 | Gladstone et al. |
| 8,621,618 B1 | 12/2013 | Ramsey et al. |
| 8,701,176 B2 | 4/2014 | Ramsey et al. |
| 8,793,786 B2 | 7/2014 | Bhesania et al. |
| 8,805,881 B2 | 8/2014 | Hom et al. |
| 8,832,048 B2 | 9/2014 | Lim |
| 8,839,414 B2 | 9/2014 | Mantle et al. |
| 8,898,777 B1 | 11/2014 | Oliver |
| 8,909,673 B2 | 12/2014 | Faitelson et al. |
| 8,931,095 B2 | 1/2015 | Ramsey et al. |
| 8,938,802 B2 | 1/2015 | Davenport et al. |
| 8,959,115 B2 | 2/2015 | Marathe |
| 8,984,644 B2 | 3/2015 | Oliphant et al. |
| 9,009,828 B1 | 4/2015 | Ramsey et al. |
| 9,032,478 B2 | 5/2015 | Ballesteros et al. |
| 8,928,476 B2 | 6/2015 | Jerhotova et al. |
| 9,046,886 B2 | 6/2015 | Chong et al. |
| 9,047,336 B2 | 6/2015 | Hom et al. |
| 9,058,492 B1 | 6/2015 | Satish |
| 9,069,599 B2 | 6/2015 | Martinez et al. |
| 9,098,702 B2 | 8/2015 | Rubin et al. |
| 9,129,105 B2 | 9/2015 | Donley et al. |
| 9,130,988 B2 | 9/2015 | Seifert et al. |
| 9,137,262 B2 | 9/2015 | Qureshi et al. |
| 9,191,400 B1 | 11/2015 | Ptasinski et al. |
| 9,195,809 B1 | 11/2015 | Kaplan |
| 9,275,231 B1 | 3/2016 | Chen |
| 9,298,895 B2 | 3/2016 | Lim |
| 9,319,426 B2 | 4/2016 | Webb et al. |
| 9,338,134 B2 | 5/2016 | Yin |
| 9,338,180 B2 | 5/2016 | Ramsey et al. |
| 9,430,534 B2 | 8/2016 | Bhattacharya et al. |
| 9,438,563 B2 | 9/2016 | Yin |
| 9,438,623 B1 | 9/2016 | Thioux |
| 9,519,756 B2 | 12/2016 | Bitran et al. |
| 9,544,273 B2 | 1/2017 | Fleury et al. |
| 9,548,994 B2 | 1/2017 | Pearcy et al. |
| 9,558,352 B1 | 1/2017 | Dennison et al. |
| 9,560,062 B2 | 1/2017 | Khatri et al. |
| 9,560,068 B2 | 1/2017 | Figlin et al. |
| 9,596,252 B2 | 3/2017 | Coates et al. |
| 9,628,511 B2 | 4/2017 | Ramsey et al. |
| 9,667,656 B2 | 5/2017 | Banerjee et al. |
| 9,667,661 B2 | 5/2017 | Sharma et al. |
| 9,690,938 B1 | 6/2017 | Saxe et al. |
| 9,710,672 B2 | 7/2017 | Braun |
| 9,712,549 B2 | 7/2017 | Almurayh |
| 9,742,559 B2 | 8/2017 | Christodorescu et al. |
| 9,767,302 B2 | 9/2017 | Lim |
| 9,792,443 B1 | 10/2017 | Sheridan |
| 9,805,202 B2 | 10/2017 | Medeiros et al. |
| 9,825,989 B1 | 11/2017 | Mehra |
| 9,910,986 B1 | 3/2018 | Saxe |
| 9,934,376 B1 | 4/2018 | Ismael |
| 9,973,524 B2 | 5/2018 | Boyer et al. |
| 9,998,480 B1 | 6/2018 | Gates |
| 10,038,706 B2 | 7/2018 | Mekky |
| 10,050,992 B2 | 8/2018 | Thyni et al. |
| 10,063,582 B1 | 8/2018 | Feng et al. |
| 10,114,954 B1 | 10/2018 | Bellis |
| 10,116,500 B1 | 10/2018 | Long et al. |
| 10,218,733 B1 | 2/2019 | Amidon |
| 10,270,790 B1 * | 4/2019 | Jackson .............. H04L 63/1425 |
| 10,277,625 B1 | 4/2019 | Efstathopoulos |
| 10,311,231 B1 | 6/2019 | Kayyoor et al. |
| 10,348,747 B2 | 7/2019 | Yamada |
| 10,356,125 B2 | 7/2019 | Goutal et al. |
| 10,382,473 B1 | 8/2019 | Ashkenazy |
| 10,382,489 B2 | 8/2019 | Das et al. |
| 10,419,903 B2 | 9/2019 | Singh et al. |
| 10,425,223 B2 | 9/2019 | Roth et al. |
| 10,454,950 B1 | 10/2019 | Aziz |
| 10,474,813 B1 | 11/2019 | Ismael |
| 10,474,820 B2 | 11/2019 | Manadhata |
| 10,491,632 B1 | 11/2019 | Natarajan et al. |
| 10,521,584 B1 | 12/2019 | Sharifi Mehr |
| 10,558,809 B1 | 2/2020 | Joyce |
| 10,567,407 B2 | 2/2020 | Tang et al. |
| 10,594,713 B2 | 3/2020 | McLean |
| 10,601,865 B1 | 3/2020 | Mesdaq et al. |
| 10,642,753 B1 | 5/2020 | Steinberg |
| 10,691,810 B1 | 6/2020 | Freitag |
| 10,726,127 B1 | 7/2020 | Steinberg |
| 10,728,263 B1 | 7/2020 | Neumann |
| 10,735,470 B2 | 8/2020 | Vidas et al. |
| 10,754,958 B1 | 8/2020 | Sidagni |
| 10,762,206 B2 | 9/2020 | Titonis et al. |
| 10,785,238 B2 | 9/2020 | McLean et al. |
| 10,834,128 B1 | 11/2020 | Rajogopalan et al. |
| 10,841,337 B2 | 11/2020 | Kinder |
| 10,853,431 B1 | 12/2020 | Lin et al. |
| 10,855,717 B1 | 12/2020 | Feiman |
| 10,868,825 B1 | 12/2020 | Dominessy |
| 10,915,828 B2 | 2/2021 | Qhi |
| 10,944,758 B1 | 3/2021 | Nagargadde |
| 11,003,718 B2 | 5/2021 | McLean et al. |
| 11,038,920 B1 | 6/2021 | Sellers |
| 11,044,263 B2 | 6/2021 | McLean et al. |
| 11,113,086 B1 | 9/2021 | Steinberg |
| 11,140,193 B2 | 10/2021 | Patel |
| 11,165,862 B2 | 11/2021 | Austin et al. |
| 11,275,831 B1 | 3/2022 | Aouad et al. |
| 11,693,972 B2 | 7/2023 | Nunes |
| 11,757,907 B1 | 9/2023 | Berger |
| 11,863,577 B1 | 1/2024 | Miseiko |
| 2002/0129135 A1 | 9/2002 | Delany et al. |
| 2002/0199122 A1 | 12/2002 | Davis |
| 2004/0128543 A1 | 7/2004 | Blake |
| 2005/0060295 A1 | 3/2005 | Gould et al. |
| 2005/0138204 A1 | 6/2005 | Iyer et al. |
| 2005/0166072 A1 | 7/2005 | Converse |
| 2005/0288939 A1 | 12/2005 | Peled et al. |
| 2006/0012815 A1 | 1/2006 | Ebner et al. |
| 2006/0037076 A1 | 2/2006 | Roy |
| 2006/0195575 A1 | 8/2006 | Delany et al. |
| 2006/0253447 A1 | 11/2006 | Judge |
| 2007/0143852 A1 | 6/2007 | Keanini |
| 2007/0192867 A1 | 8/2007 | Miliefsky |
| 2007/0226248 A1 | 9/2007 | Darr |
| 2007/0226807 A1 | 9/2007 | Ginter et al. |
| 2007/0294756 A1 | 12/2007 | Fetik |
| 2008/0077593 A1 | 3/2008 | Abrams et al. |
| 2008/0219334 A1 | 9/2008 | Brainos et al. |
| 2008/0255997 A1 | 10/2008 | Bluhm et al. |
| 2008/0262991 A1 | 10/2008 | Kapoor |
| 2008/0301798 A1 | 12/2008 | Hao |
| 2008/0320000 A1 | 12/2008 | Gaddam |
| 2009/0038015 A1 | 2/2009 | Diamant |
| 2009/0198682 A1 | 8/2009 | Buehler et al. |
| 2010/0083374 A1 | 4/2010 | Schmitlin et al. |
| 2010/0125913 A1 | 5/2010 | Davenport et al. |
| 2010/0251329 A1 | 9/2010 | Wei et al. |
| 2011/0004771 A1 | 1/2011 | Matsushima et al. |
| 2011/0179492 A1 | 7/2011 | Markopoulou et al. |
| 2011/0197056 A1 | 8/2011 | Chen |
| 2011/0276604 A1 | 11/2011 | Hom et al. |
| 2011/0276716 A1 | 11/2011 | Coulson |

(56) References Cited

U.S. PATENT DOCUMENTS

| | | |
|---|---|---|
| 2012/0072983 A1 | 3/2012 | McCusker et al. |
| 2012/0117640 A1 | 5/2012 | Ramsey et al. |
| 2012/0185275 A1 | 7/2012 | Loghmani |
| 2012/0246730 A1 | 9/2012 | Raad |
| 2012/0254333 A1 | 10/2012 | Chandramouli |
| 2012/0260341 A1 | 10/2012 | Chan et al. |
| 2013/0104191 A1 | 4/2013 | Peled et al. |
| 2013/0138428 A1 | 5/2013 | Chandramouli |
| 2013/0173620 A1 | 7/2013 | Takenouchi |
| 2013/0226938 A1 | 8/2013 | Risher et al. |
| 2013/0238319 A1 | 9/2013 | Minegishi et al. |
| 2013/0282746 A1 | 10/2013 | Balko et al. |
| 2013/0291103 A1 | 10/2013 | Davenport et al. |
| 2013/0318604 A1 | 11/2013 | Coates et al. |
| 2014/0041028 A1 | 2/2014 | Ramsey et al. |
| 2014/0047544 A1 | 2/2014 | Jakobsson |
| 2014/0051432 A1 | 2/2014 | Gupta et al. |
| 2014/0143863 A1 | 5/2014 | Deb et al. |
| 2014/0165195 A1 | 6/2014 | Brdiczka et al. |
| 2014/0181981 A1 | 6/2014 | Christodorescu |
| 2014/0222712 A1 | 8/2014 | Samaha et al. |
| 2014/0283081 A1 | 9/2014 | Sheridan |
| 2014/0283083 A1 | 9/2014 | Gula |
| 2014/0331207 A1 | 11/2014 | Sridharan |
| 2014/0373151 A1 | 12/2014 | Webb et al. |
| 2015/0019323 A1 | 1/2015 | Goldberg et al. |
| 2015/0040225 A1 | 2/2015 | Coates et al. |
| 2015/0074390 A1 | 3/2015 | Stoback |
| 2015/0135287 A1 | 5/2015 | Medeiros et al. |
| 2015/0135320 A1 | 5/2015 | Coskun |
| 2015/0156212 A1 | 6/2015 | Khatri et al. |
| 2015/0186618 A1 | 7/2015 | Poorvin et al. |
| 2015/0222652 A1 | 8/2015 | Ramsey et al. |
| 2015/0271047 A1 | 9/2015 | McLean |
| 2015/0310211 A1 | 10/2015 | Mei et al. |
| 2015/0324457 A1 | 11/2015 | McLean |
| 2015/0332054 A1 | 11/2015 | Eck |
| 2015/0365437 A1 | 12/2015 | Bell, Jr. |
| 2016/0006749 A1 | 1/2016 | Cohen et al. |
| 2016/0014140 A1 | 1/2016 | Akireddy et al. |
| 2016/0014151 A1 | 1/2016 | Prakash |
| 2016/0078365 A1 | 3/2016 | Baumard |
| 2016/0099963 A1 | 4/2016 | Mahaffey et al. |
| 2016/0112445 A1 | 4/2016 | Abramowitz |
| 2016/0134653 A1 | 5/2016 | Vallone |
| 2016/0139886 A1 | 5/2016 | Perdriau et al. |
| 2016/0156655 A1 | 6/2016 | Lotem et al. |
| 2016/0162690 A1 | 6/2016 | Reith |
| 2016/0182546 A1 | 6/2016 | Coates et al. |
| 2016/0205127 A1 | 7/2016 | Roehl |
| 2016/0241591 A1 | 8/2016 | Ramsey et al. |
| 2016/0248789 A1 | 8/2016 | Nakamatsu |
| 2016/0253497 A1 | 9/2016 | Christodorescu |
| 2016/0277423 A1 | 9/2016 | Apostolescu et al. |
| 2016/0313709 A1 | 10/2016 | Biesdorf et al. |
| 2016/0337400 A1 | 11/2016 | Gupta |
| 2016/0342805 A1 | 11/2016 | Lim |
| 2016/0378978 A1 | 12/2016 | Singla et al. |
| 2017/0026343 A1 | 1/2017 | Wardman |
| 2017/0026391 A1 | 1/2017 | Abu-Nimeh |
| 2017/0063893 A1 | 3/2017 | Franc et al. |
| 2017/0063905 A1 | 3/2017 | Muddu et al. |
| 2017/0093902 A1 | 3/2017 | Roundy et al. |
| 2017/0098087 A1 | 4/2017 | Li |
| 2017/0111379 A1 | 4/2017 | Khatri et al. |
| 2017/0140295 A1 | 5/2017 | Bandara |
| 2017/0142149 A1 | 5/2017 | Coates et al. |
| 2017/0169154 A1 | 6/2017 | Lin et al. |
| 2017/0171228 A1 | 6/2017 | McLean |
| 2017/0180418 A1 | 6/2017 | Shen |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |
| 2017/0208084 A1 | 7/2017 | Steelman et al. |
| 2017/0208085 A1 | 7/2017 | Steelman et al. |
| 2017/0243004 A1 | 8/2017 | Kinder et al. |
| 2017/0243005 A1 | 8/2017 | Kinder et al. |
| 2017/0243009 A1 | 8/2017 | Sejpal |
| 2017/0244734 A1 | 8/2017 | Kinder et al. |
| 2017/0244750 A1 | 8/2017 | Kinder et al. |
| 2017/0244754 A1 | 8/2017 | Kinder et al. |
| 2017/0244762 A1 | 8/2017 | Kinder et al. |
| 2017/0318033 A1 | 11/2017 | Holland et al. |
| 2017/0318034 A1 | 11/2017 | Holland et al. |
| 2017/0346839 A1 | 11/2017 | Peppe |
| 2017/0359368 A1 | 12/2017 | Hodgman |
| 2018/0004948 A1 | 1/2018 | Martin |
| 2018/0069885 A1 | 3/2018 | Patterson |
| 2018/0077189 A1 | 3/2018 | Doppke et al. |
| 2018/0077195 A1 | 3/2018 | Gathala |
| 2018/0089574 A1 | 3/2018 | Goto |
| 2018/0091306 A1 | 3/2018 | Antonopoulos et al. |
| 2018/0096140 A1 | 4/2018 | Bulygin |
| 2018/0103010 A1 | 4/2018 | Diaz Cuellar et al. |
| 2018/0124073 A1 | 5/2018 | Scherman et al. |
| 2018/0124085 A1 | 5/2018 | Frayman et al. |
| 2018/0124094 A1 | 5/2018 | Hamdi |
| 2018/0129811 A1 | 5/2018 | Diu |
| 2018/0152480 A1 | 5/2018 | Kinder et al. |
| 2018/0181599 A1 | 6/2018 | Crabtree et al. |
| 2018/0219899 A1 | 8/2018 | Joy |
| 2018/0234434 A1 | 8/2018 | Viljoen |
| 2018/0288198 A1 | 10/2018 | Pope et al. |
| 2018/0324203 A1 | 11/2018 | Estes |
| 2018/0367550 A1 | 12/2018 | Musuvathi et al. |
| 2019/0014149 A1 | 1/2019 | Cleveland et al. |
| 2019/0037406 A1 | 1/2019 | Wash |
| 2019/0050554 A1 | 2/2019 | Fiske |
| 2019/0068630 A1 | 2/2019 | Valecha et al. |
| 2019/0095320 A1 | 3/2019 | Biswas et al. |
| 2019/0095801 A1 | 3/2019 | Saillet et al. |
| 2019/0102554 A1 | 4/2019 | Luo et al. |
| 2019/0102564 A1 | 4/2019 | Li |
| 2019/0102646 A1 | 4/2019 | Redmon |
| 2019/0104154 A1 | 4/2019 | Kumar et al. |
| 2019/0109717 A1 | 4/2019 | Reddy |
| 2019/0122258 A1 | 4/2019 | Bramberger et al. |
| 2019/0132344 A1 | 5/2019 | Lem et al. |
| 2019/0166149 A1 | 5/2019 | Gerrick |
| 2019/0166152 A1 | 5/2019 | Steele |
| 2019/0173919 A1 | 6/2019 | Irimie |
| 2019/0242718 A1 | 8/2019 | Siskind et al. |
| 2019/0258807 A1 | 8/2019 | DiMaggio et al. |
| 2019/0297096 A1 | 9/2019 | Ahmed et al. |
| 2019/0342296 A1 | 11/2019 | Anandam et al. |
| 2019/0347423 A1 | 11/2019 | Sanossian |
| 2019/0347433 A1 | 11/2019 | Chakravorty et al. |
| 2020/0012796 A1 | 1/2020 | Trepagnier |
| 2020/0036750 A1 | 1/2020 | Bahnsen |
| 2020/0036751 A1 | 1/2020 | Kohavi |
| 2020/0057857 A1 | 2/2020 | Roytman |
| 2020/0074084 A1 | 3/2020 | Dorrans |
| 2020/0082080 A1 | 3/2020 | Boulton |
| 2020/0097662 A1 | 3/2020 | Hufsmith |
| 2020/0097663 A1 | 3/2020 | Sato |
| 2020/0110873 A1 | 4/2020 | Rosendahl |
| 2020/0120126 A1 | 4/2020 | Ocepek |
| 2020/0177618 A1 | 6/2020 | Hassanzadeh |
| 2020/0186544 A1 | 6/2020 | Dichiu et al. |
| 2020/0186569 A1 | 6/2020 | Milazzo |
| 2020/0195683 A1 | 6/2020 | Kuppa et al. |
| 2020/0210590 A1 | 7/2020 | Doyle |
| 2020/0213346 A1 | 7/2020 | Shafet |
| 2020/0257792 A1 | 8/2020 | Rivard |
| 2020/0259791 A1 | 8/2020 | Garcia et al. |
| 2020/0274894 A1 | 8/2020 | Argoeti et al. |
| 2020/0285737 A1* | 9/2020 | Kraus ............ G06F 21/552 |
| 2020/0285952 A1 | 9/2020 | Liu et al. |
| 2020/0314122 A1 | 10/2020 | Jones et al. |
| 2020/0327237 A1 | 10/2020 | Shakarian |
| 2020/0329062 A1* | 10/2020 | Beauchesne ........ H04L 63/105 |
| 2020/0336497 A1 | 10/2020 | Seul et al. |
| 2020/0351285 A1 | 11/2020 | Eisenkot et al. |

(56) References Cited

U.S. PATENT DOCUMENTS

| | | |
|---|---|---|
| 2020/0351302 A1 | 11/2020 | Kyle |
| 2020/0351307 A1 | 11/2020 | Vidas et al. |
| 2020/0356665 A1* | 11/2020 | Denney ............... G06N 7/01 |
| 2020/0358795 A1 | 11/2020 | Urbanski et al. |
| 2020/0358819 A1 | 11/2020 | Bowditch et al. |
| 2020/0364338 A1* | 11/2020 | Ducau ................ G06F 21/564 |
| 2020/0372129 A1 | 11/2020 | Gupta |
| 2020/0380119 A1* | 12/2020 | Correa Bahnsen ... G06F 21/566 |
| 2020/0394309 A1 | 12/2020 | Angelo et al. |
| 2021/0006575 A1 | 1/2021 | McLean et al. |
| 2021/0012012 A1 | 1/2021 | Soroush |
| 2021/0034752 A1 | 2/2021 | Canada |
| 2021/0034753 A1 | 2/2021 | Canada |
| 2021/0034895 A1 | 2/2021 | Archibald |
| 2021/0067562 A1 | 3/2021 | Kinder et al. |
| 2021/0103663 A1 | 4/2021 | Gadhe |
| 2021/0109797 A1 | 4/2021 | Zhou |
| 2021/0112087 A1 | 4/2021 | Tassoumt |
| 2021/0112090 A1 | 4/2021 | Rivera et al. |
| 2021/0133320 A1 | 5/2021 | Havenga |
| 2021/0157926 A1 | 5/2021 | Handurukande |
| 2021/0157945 A1 | 5/2021 | Cobb |
| 2021/0160273 A1 | 5/2021 | Choi |
| 2021/0173930 A1 | 6/2021 | Dahal |
| 2021/0185057 A1 | 6/2021 | McLean |
| 2021/0192057 A1 | 6/2021 | Helfman |
| 2021/0194853 A1 | 6/2021 | Xiao |
| 2021/0216928 A1 | 7/2021 | O'Toole |
| 2021/0226926 A1 | 7/2021 | Crabtree |
| 2021/0226970 A1 | 7/2021 | Ross et al. |
| 2021/0258327 A1 | 8/2021 | Felke et al. |
| 2021/0273957 A1 | 9/2021 | Boyer |
| 2021/0281609 A1 | 9/2021 | Crabtree |
| 2021/0306372 A1 | 9/2021 | Koral |
| 2021/0312058 A1 | 10/2021 | Chiarelli |
| 2021/0312351 A1 | 10/2021 | Pourmohammad |
| 2021/0360007 A1 | 11/2021 | Paquin |
| 2021/0390181 A1 | 12/2021 | McClay |
| 2022/0004643 A1 | 1/2022 | Sloane |
| 2022/0014542 A1 | 1/2022 | Janakiraman |
| 2022/0021691 A1 | 1/2022 | Bhatkar |
| 2022/0038424 A1 | 2/2022 | Liu et al. |
| 2022/0043911 A1 | 2/2022 | Pomerantsev |
| 2022/0070182 A1 | 3/2022 | Bowditch et al. |
| 2022/0070193 A1* | 3/2022 | Konda ............... G06N 3/08 |
| 2022/0078203 A1 | 3/2022 | Shakarian |
| 2022/0083644 A1 | 3/2022 | Kulshreshtha |
| 2022/0100868 A1 | 3/2022 | Tarrant |
| 2022/0159033 A1 | 5/2022 | Mizrahi |
| 2022/0179908 A1 | 6/2022 | Wei |
| 2022/0191230 A1 | 6/2022 | Morgan |
| 2022/0206819 A1 | 6/2022 | Pokam |
| 2022/0210656 A1 | 6/2022 | Shaw |
| 2022/0237764 A1 | 7/2022 | Mullet |
| 2022/0263850 A1 | 8/2022 | Colyandro, Jr. |
| 2022/0394034 A1 | 12/2022 | Keith |
| 2022/0400135 A1 | 12/2022 | Gamra |
| 2022/0407891 A1 | 12/2022 | Albanese |
| 2022/0414206 A1 | 12/2022 | Hinkle |
| 2023/0038196 A1 | 2/2023 | Labreche |
| 2023/0370486 A1 | 11/2023 | Paquette et al. |
| 2023/0421578 A1 | 12/2023 | Mullins et al. |

FOREIGN PATENT DOCUMENTS

| | | |
|---|---|---|
| RU | 2738344 C1 | 12/2020 |
| WO | WO2007/002749 A2 | 1/2007 |
| WO | WO2007/090605 A1 | 8/2007 |
| WO | WO2010/059843 A2 | 5/2010 |
| WO | WO2021/067238 A1 | 4/2021 |

OTHER PUBLICATIONS

Buyukkayhan, Ahmet Sali; Oprea, Alina; Li, Zhou; and Robertson, William; *"Lens on the endpoint; Hunting for malicious software through endpoint data analysis"*; International Symposium on Research in Attacks, Intrusions, and Defenses; RAID 2017: Research in Attacks, Intrusions, and Defenses Proceedings; pp. 73-79; Sep. 18-20, 2017; Atlanta, GA, USA.

SECUREWORKS-Log Management-Protect your infrastructure from known and emerging threats; www.secureworks.com/resources/ds-log-management; 2015 (available).

Sofya Raskhodnikova & Adam Smith; CSE 598A Algorithmic Challenges in Data Privacy; Lecture 2; Jan. 19, 2010.

Afroz, S. and Greenstadt, R. "PhishZoo: Detecting Phishing Websites by Looking at Them"; IEEE Fifth International Conference on Semantic Computing, 2011; pp. 368-375; doi: 10.1109/ICSC.2011.52; 2011.

Alkhawlani, Mohammed, Elmogy, Mohammed and Elbakry, Hazem; "Content-based image retrieval using local features descriptors and bag-of-visual words"; International Journal of Advanced Computer Science and Applications, vol. 6 No. 9 2015; pp. 212-219; 2015.

Buber, E., Demir, O. and Sahingoz, O.K.; "Feature selections for the machine learning based detection of phishing websites"; 2017 International Artificial Intelligence and Data Processing Symposium (IDAP), 2017; pp. 1-5; doi: 10.1109/DAP.2017.8090317; 2017.

Lin, Tsung-Yi, et al.; "Microsoft coco: Common objects in context"; European Conference on Computer Vision, Springer, Cham, 2014; 2014.

Liu, Y., Wang, Q., Zhuang, M. and Zhu, Y .; Reengineering Legacy Systems with RESTFul Web Service; 2008 32$^{nd}$ Annual IEEE International Computer Software and Applications Conference, 2008; pp. 785-790; doi: 10.1109/COMPSAC.2008.89; 2008.

White, Joshua S., Matthews, Jeanna N., and Stacy, John L.; A method for the automated detection phishing websites through both site characteristics and image analysis Cyber Sensing 2012; vol. 8408; International Society for Optics and Photonics, 2012; 2012.

URLVoid; URLVoid.com; retrieved from archives.org: https:web.archive.org/web/20180730215132/https.://www.urlvoid.com/); Published Jul. 30, 2018.

* cited by examiner

SYSTEMS AND METHODS FOR DETECTING MALICIOUS HANDS-ON-KEYBOARD ACTIVITY VIA MACHINE LEARNING

BACKGROUND

Organizations of all types and sizes face an ever-increasing threat from security breaches, malicious attacks, and other unauthorized activity, including those associated with electronic criminal activity ("e-crime") and cyber-espionage. It is common to see advanced threat actors launch cyber-operations against particular entities or industries without pre-existing indicators of such attacks. However, over time, indicators of compromise (IOCs) or other digital forensic attributes can be revealed, such as those discovered during incident response engagements or by third parties. Knowing and curating such attributes, techniques, or other indicators of unauthorized cyber-activity, can aid in threat detection and/or attribution. However, some advanced threat actors, will seek to go undetected for as long as possible to achieve their objectives. After gaining access to information systems and the ability to remotely execute code, these threat actors will sometimes perform their activities by manually typing commands on their keyboard rather than using automated scripts or pre-compiled malware that can be easier to detect. This is often done as the actor transitions between gathering information, analyzing it, and leveraging the results of said analysis to gain additional accesses or take actions on their objectives.

Advanced threat actors often mimic the actions and appearance of authorized personnel by using pre-existing credentials and system administration software to avoid detection. When such covert techniques are employed to mimic routine business actions/activities, those actions are often more difficult to detect. The fidelity of potential IOCs associated with such advanced threat actors can be significantly lower than those that employ file-based malware, which can result in both delays and/or failures in the detection of such attacks. Accordingly, a need exists for the improved behavioral detection of advanced threat actors, especially when they are conducting more important stages of their operations via hands-on-keyboard activity. The present disclosure addresses the foregoing and other related and unrelated problems/issues in the art.

SUMMARY

Briefly described, in one aspect, the present disclosure is directed to the systems and methods for the aggregation and review of evidence, including telemetry from endpoint and extended detection and response systems collected over time for the detection of unauthorized and malicious hands-on-keyboard activity. During an initial feature extraction stage or operation, a plurality of partial values and/or attributes of the received/collected telemetry, e.g. processes, network connections, domain names, URLs, files/scripts/macros and operations thereon, terminal commands, kernel objects, named pipes, event tracings, module/library loads, thread injections, system/hypervisor calls, memory analysis, scheduled tasks, shortcuts, service names, registry keys, digital certificates, authentication events, and various other software, hardware, and user attributes, are decomposed and tokenized.

In one aspect, as telemetry corresponding to hands-on-keyboard activities and other manual actions is received from an information system or systems, e.g. from various logs generated by such information handling systems, the systems and methods of the present disclosure will parse and tokenize the telemetry, taking a snapshot or view of the collected telemetry, and will extract a series of features indicative of various idiosyncrasies or detected actions. The extracted features will be tokenized and then aggregated over a finite window of time. Statistics will be extracted from the aggregated tokens to characterize temporal attributes of the tokens within the time window. Additional attributes can also be included in the feature vector, such as those associated with the information system's operating system, other software, hardware, and/or its user. The aggregated features will be provided to one or more machine learning subsystems, which can include one or more classifiers, which are trained to identify threat actors based on historical examples in order to differentiate it from authorized activities over similar time periods. The machine learning systems will generate preliminary scores and feed those to an ensemble classifier/learning system to generate an overall behavioral threat score of the likelihood that features of the telemetry over a prescribed time period resulting from unauthorized or malicious hands-on-keyboard activity.

In some embodiments, the tokenization of the telemetry can itself be based on examples of known threat actors interacting with target systems. Even if IOCs would generate too many false positives on their own, they can be useful input to a broader machine learning-based system that combines probabilistic information from a variety of sources. In embodiments, lower fidelity IOCs (used as tokens) are counter-intuitively preferred to increase the potential recall of future activity by the same actors. It can then be the responsibility of downstream machine learning subsystems to compensate for the noisy IOCs and increase the detector's overall precision when examining the totality of evidence contained in the aggregate feature vector(s).

Multiple machine learning subsystems can be run in parallel, and can be configured to use different classification/regression strategies, and/or can be optimized to detect different threat actors and/or focus on particular tactics, techniques, and/or procedures. The system further generally uses historical examples of both malicious activity conducted manually by threat actors seeking to avoid detection as well large amounts of authorized activity that is itself a mixture of some manual and more prevalent automated activity. The examples of authorized and unauthorized activities are used to train the machine learning subsystems to identify similar attacks in the future, more rapidly and with much higher fidelity.

In one aspect, a method for detecting malicious hands-on-keyboard activity in an information handling system can include receiving telemetry from one or more client systems, tokenizing a plurality of partial values/idiosyncrasies detected in the telemetry to form a plurality of tokens, aggregating the plurality of tokens or features over a selected time window to at least partially develop an aggregate feature vector, submitting the aggregate feature vector to one or more machine learning subsystems, and applying an ensemble model to one or more outputs from the one or more machine learning subsystems to generate an overall behavioral threat score of the unauthorized hands-on-keyboard activity.

In another aspect, a system for detecting manually-conducted unauthorized activity can include one or more storage media for telemetry from one or more information handling systems and at least one processor programmed to execute instructions stored in memory and operable to collect telemetry corresponding to the monitored keyboard activity from the one or more information handling systems, tokenize a plurality of partial values/idiosyncrasies detected in the telemetry to form a plurality of tokens, aggregate the plurality of tokens over a selected time window to at least partially develop an aggregate feature vector, submit the aggregate feature vector to one or more machine learning subsystems, and apply an ensemble model to one or more outputs from the one or more machine learning subsystems to generate a behavioral threat score.

Various objects, features and advantages of the present disclosure will become apparent to those skilled in the art upon a review of the following detail description, when taken in conjunction with the accompanying drawings.

BRIEF DESCRIPTION OF THE FIGURES

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the Figures is provided to assist in understanding the teachings disclosed herein. While the description discloses various implementations and embodiments of the teachings, and is provided to assist in describing the teachings, the implementation, features, and embodiments discussed herein should not be interpreted as a limitation on the scope or applicability of the teachings.

Figure 1:
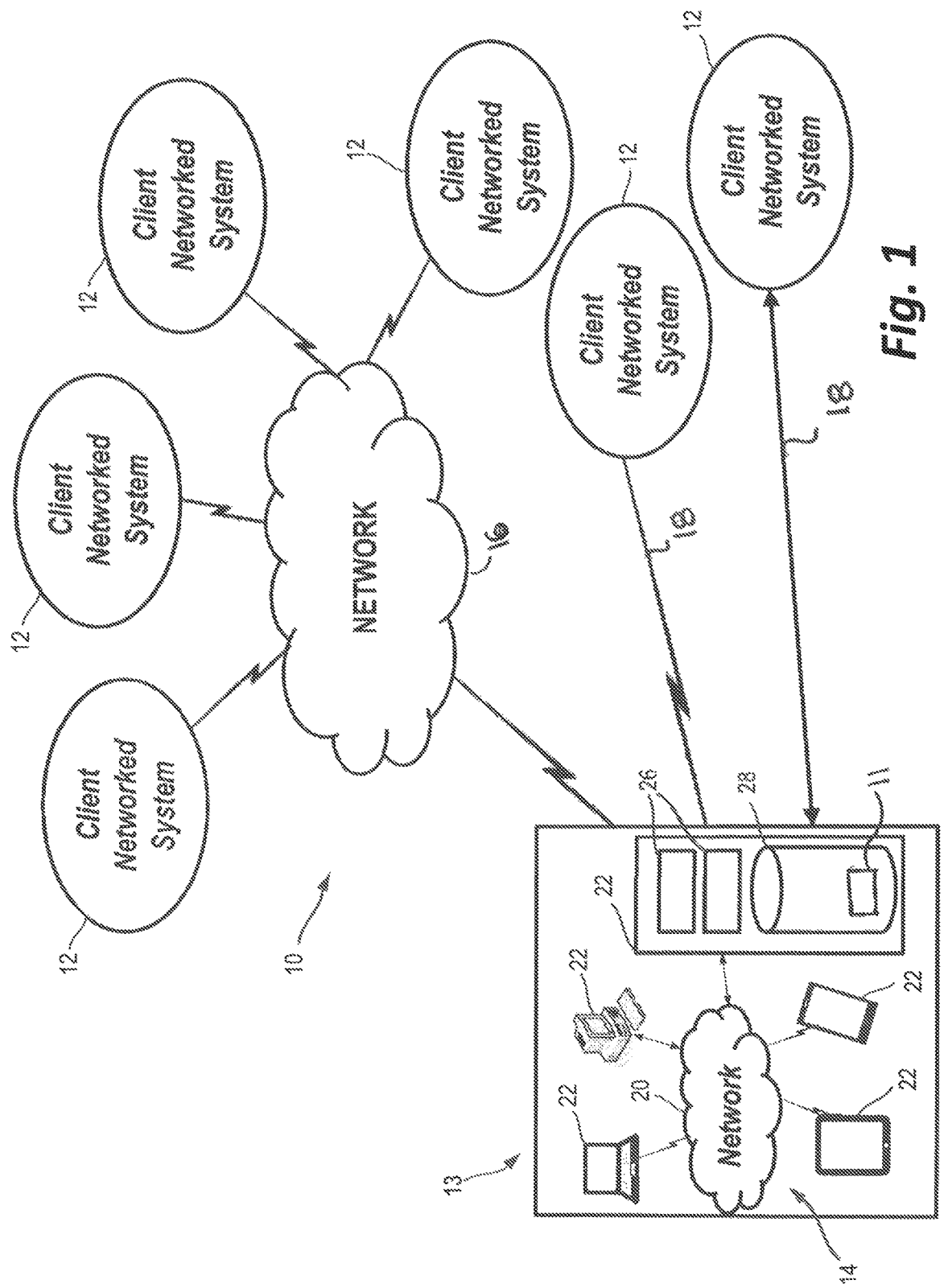
FIG. 1 is a schematic diagram of a system for security information and event management according to one aspect of the present disclosure.

FIG. 1 is a diagram illustrating a security and event management system 10 operable to enable or facilitate discovery of security threats or malicious actions across distinct organizations or clients, by using security data to generate risk scores associated with a series of indicators of compromise (IOCs), especially those with low fidelity, and utilizing clustering of and/or similarities with other organizations/clients that have or may have been compromised. As shown in FIG. 1, a series of organization/client networked systems 12 can be in communication with a security event management center 13 including one or more data management centers 14 managed, e.g., by an MSSP (Managed Security Service Provider). The networked systems 12 can communicate with the data center 14 through a network 16, such as a public or private network, e.g., a local area network, though client/customer information handling systems 12 can be in communication with the data center 14 through other suitable lines of communication 18, such as peer to peer file sharing systems, or other suitable wireless, virtual, and/or wired connections. The data center 14 can further include one or more internal networks 20 with a plurality of information handling systems 22, connected thereto. In one embodiment, the information handling systems 22 can include one or more processors 26 and one or more memories or other suitable storage mediums 28. The memory 28 can include a random access memory (RAM), read only memory (ROM), and/or other non-transitory computer readable mediums.

Figure 2:
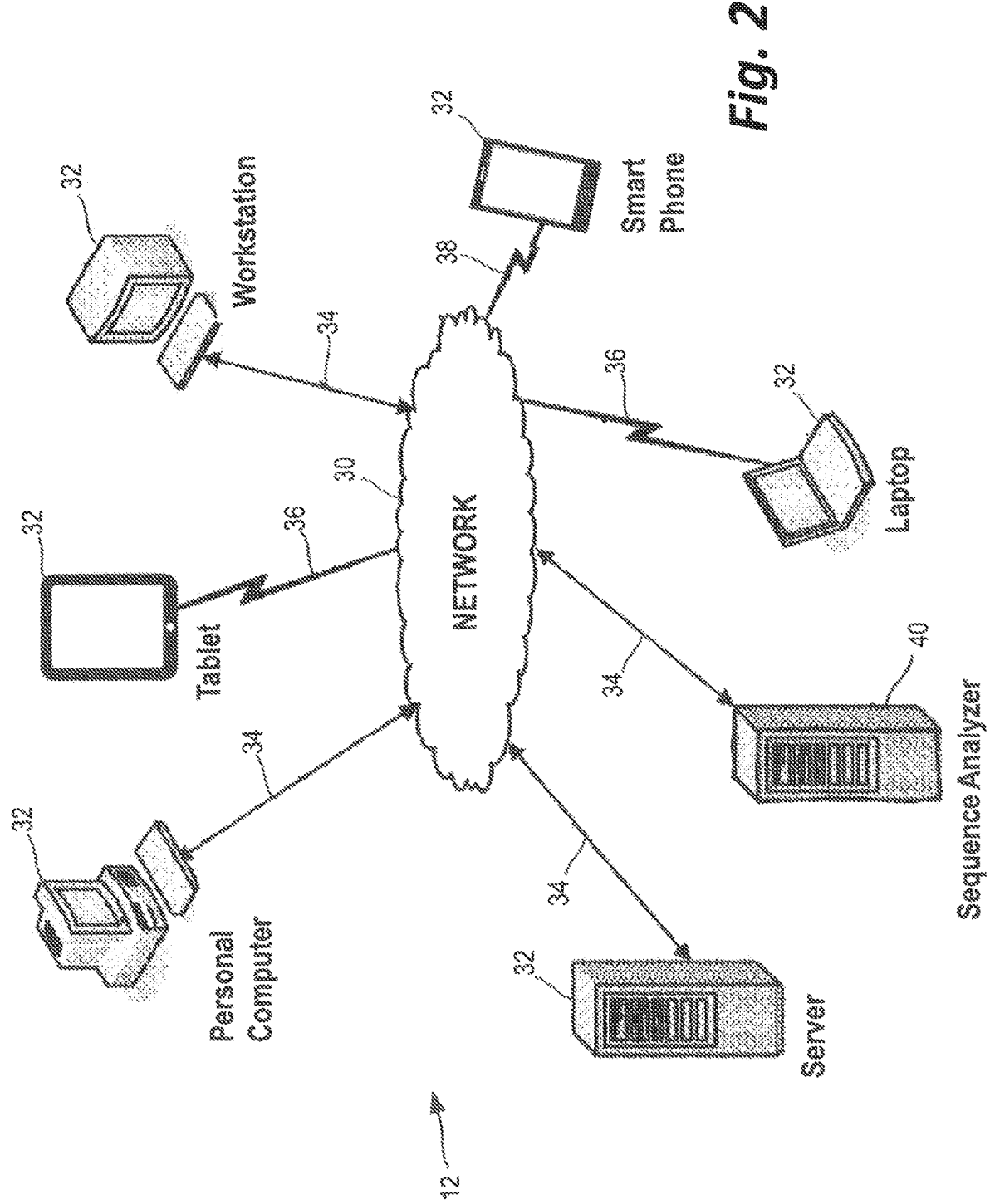
FIG. 2 is a schematic diagram of a client/customer networked system of information handling systems according to one aspect of the present disclosure.

FIG. 2 diagrammatically illustrates an exemplary client/customer networked system 12. The system 12 can include a network 30, which may include the internet or another wide area network, a local area network, or a combination thereof. The network 30 may provide data communications among a series of information handling systems 32, which can include workstations, personal computers, smart cellular telephones, personal digital assistants, laptop computers, servers, and other suitable devices. The information handling systems 32 can be coupled to the network 30 through wireline connections 34, wireless connections 36, such as Wi-Fi or cellular connections, or other suitable lines of communication, or combinations thereof. In some aspects, the information handling systems 32 of the networked systems 12 generally can be configured for a specific user or a specific use, such as financial transaction processing, airline reservations, enterprise data storage, online shopping, global communications, etc.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, a touchscreen and/or a video display. The information handling system also may include one or more buses operable to transmit communications between the various hardware components.

As shown in FIG. 2, the client/customer networked systems 12 further may include one or more monitoring devices 40 communicatively coupled to the network 30, for example, through a wired connection 34, though or other suitable connections, such as a wireless connection, also can be used. The monitoring devices 40 may include a server, a sequence analyzer or various other suitable computing devices that have a processor and a memory or other suitable storage. The memory can include a random access memory (RAM), read only memory (ROM), and/or other non-transitory computer readable medium. The monitoring devices 40 further typically will be operable to store and execute computer readable instructions to continuously monitor, in real-time, activity at each networked system 12, for example, activity of the information handling systems 32 connected to network 30.

Such monitored activity can include logging on and off networks by the information handling systems 32, downloads and/or uploads, changes to system settings, IP addresses accessed by or attempting to access the network, etc. Additionally, network activities such as executed processes (i.e., type, number of times accessed, resulting actions, etc.), types and/or numbers of files modified, network connections, memory forensic attributes, and similar logged or other Digital Forensics and Incident Response (DFIR) investigative activities can also be monitored and collected as part of security log data/records.

The monitoring device(s) 40 communicatively coupled to the organization/client networked system 12 additionally can be configured to aggregate, ingest, or otherwise receive forensic information, such as specific security related data, security or event logs, raw data, and/or other suitable records or information, based at least in part on monitored activity of the plurality of devices 32 and/or the networked systems 12. The security data may be stored in the memory or storage of the monitoring devices 40 and can be communicated to and/or accessed by an MSSP providing security services for the organizations/clients. For example, each monitoring system 40 may automatically send the security data/information to the one or more servers at the MSSP data center, or the MSSP can otherwise directly access the information or security data from the memory or storage of the monitoring device(s) 14.

Forensic analyses/reviews of such data will be performed, e.g., to determine if the data has been threatened or corrupted by an actual attack or malicious actor, and responsive events determined and remediated. The resultant forensic information or security data further can be stored on the memory 28 or in servers or other suitable information handling systems 22 and/or data storage at the security event management center 13, such that the security data is accessible to be analyzed/processed by the MSSP. It further will be recognized that the monitoring devices 40 at the client/customer networked systems 12 are optional, and organizations/clients or technology partners thereof can independently monitor the networked systems, for example, using one or more of the information handling systems 32, and otherwise provide forensic information, security data or other suitable data/information to the MSSP.

With embodiments of the present disclosure, the processor(s) 26 can be operable to run or otherwise access one or more engines, computer program products, platforms, etc. that facilitate the discovery of threats and/or malicious acts across the networked systems 12. For example, the processor(s) 26 can tokenize values and/or attributes in system logs and other information received from one or more network systems, aggregate the tokens into an aggregate feature vector, apply the aggregate feature vector to one or more machine learning subsystems, and apply an ensemble classifier to the output from the machine learning subsystems to produce a behavioral threat score. As necessary, the processor(s) 26 can generate alerts and/or can take remediating and/or preventative action to address malicious activity in the networked system. In some embodiments, these risk scores further can be dynamically updated/changed as new security data is received and analyzed.

In embodiments, a threat actor that has achieved the ability to execute code in an information system such as a networked client system may perform actions in the client system, such as reconnaissance, privilege escalation, credential access, lateral movement, and other functions in support of a final objective. Some or all of this threat activity may be automated (e.g., with malware). Alternatively, a threat actor may perform these activities manually (e.g., hands-on-keyboard activity) to minimize observable indicators of compromise and to reduce the chances of being detected before achieving their long-term objectives. Such a threat actor may avoid using known signatures that could be detected by a threat monitoring system. However, a threat detection system that observes a confluence of such behavior over finite time windows lends itself to probabilistic detection using machine learning and, in exemplary embodiments, can have a high confidence of such detection.

Figure 3:
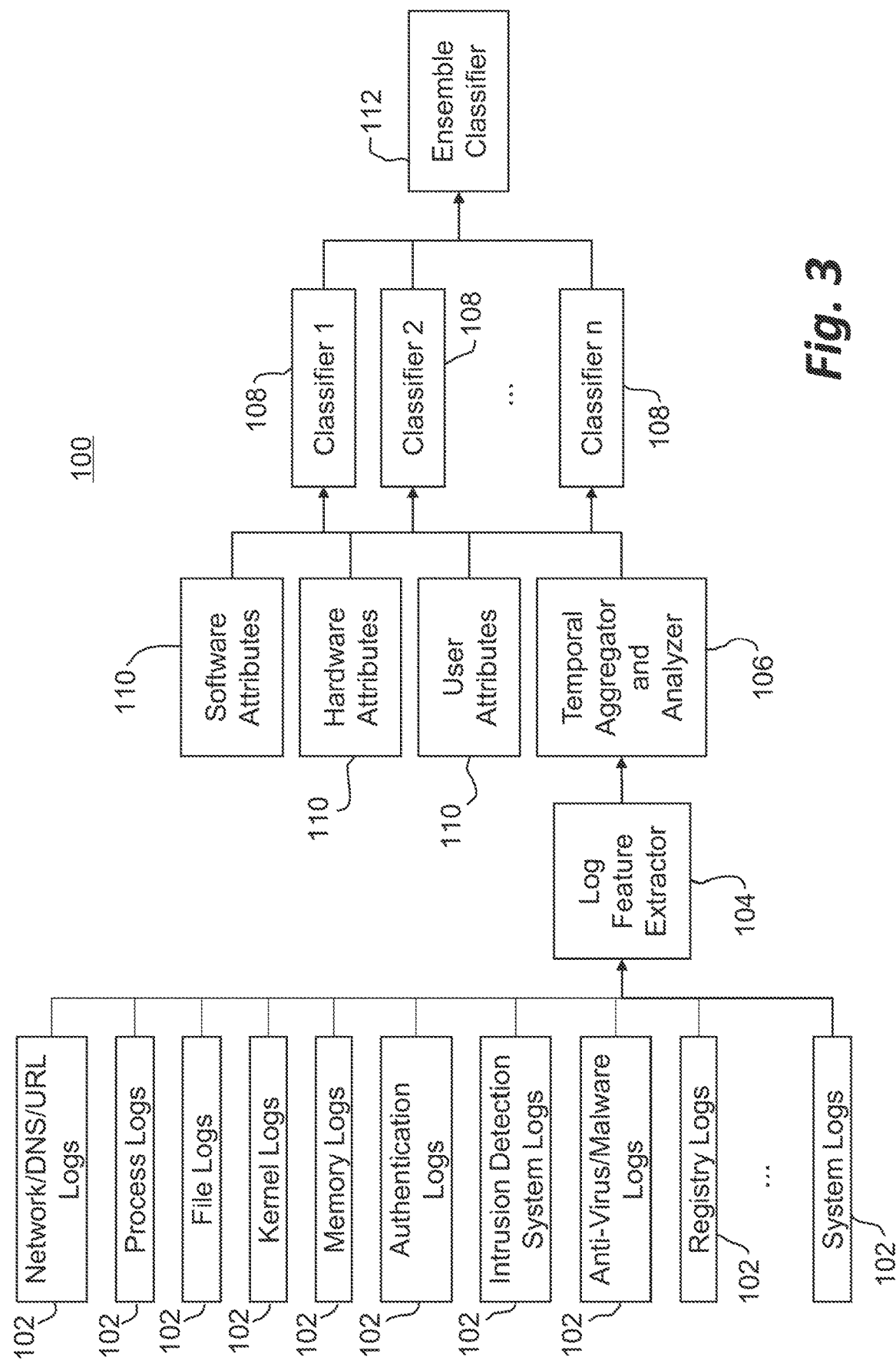
FIG. 3 shows a schematic diagram of a system for detecting unauthorized or malicious hands-on-keyboard activity according to one aspect of the present disclosure.
Figure 4A:
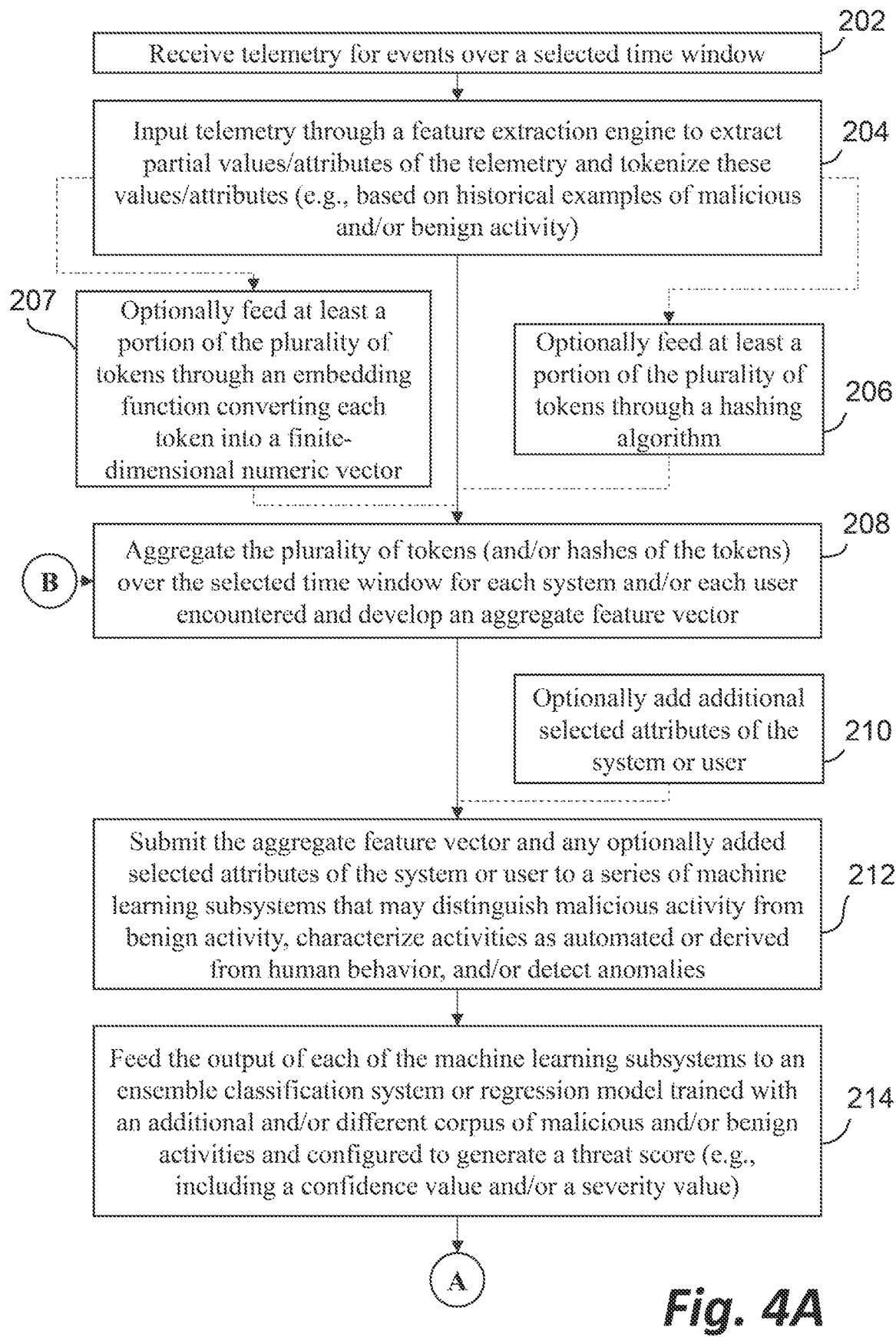
FIGS. 4A and 4B show example flow diagrams for an exemplary method/process for detecting malicious hands-on-keyboard activity according to one aspect of the present disclosure.
Figure 4B:
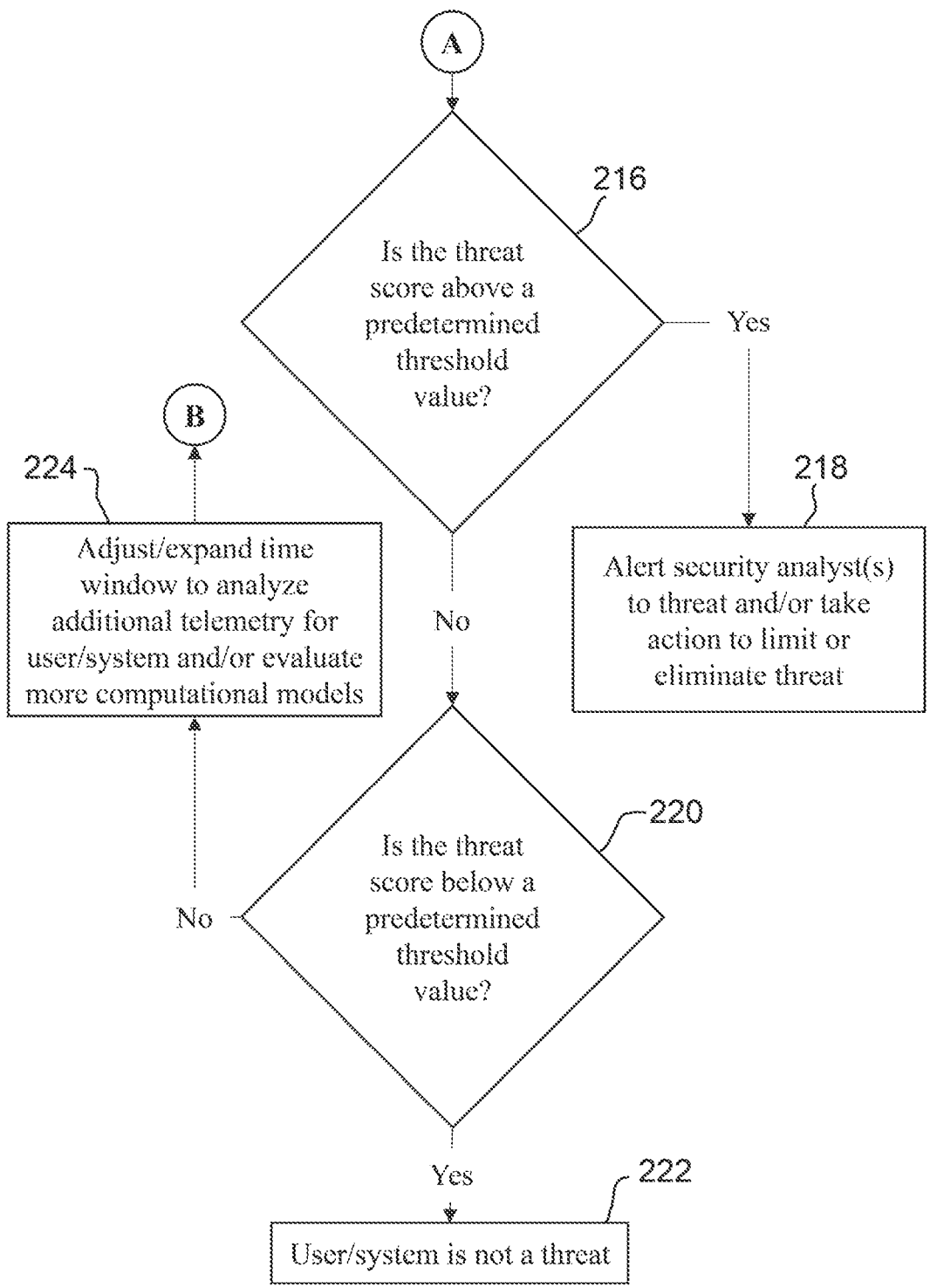

FIGS. 3-4B illustrate an embodiment of a threat detection system and a method/process of hands-on-keyboard threat detection according to the present disclosure. As shown in FIG. 3, the threat detection system 100 can include one or more inputs 102, such as network logs, process logs, file logs, kernel logs, memory logs, other suitable system logs, and/or other suitable information. For example, the inputs 102 can be received by one or more client systems that are monitored by the threat detection system 100. In embodiments, the data provided by the inputs 102 can be provided in the form of telemetry (e.g., information associated with a timestamp or other selected temporal identifier). The inputs 102 can be received by a log feature extractor 104 that can process (e.g., tokenize) the data as described in more detail below, outputting the processed data to a temporal aggregator and analyzer 106. In embodiments, the temporal aggregator and analyzer 106 can aggregate the processed data over a selected time window to develop an aggregate feature vector that is submitted to one or more machine learning subsystems 108. As shown in FIG. 3, additional information or attributes 110 such as software attributes, hardware attributes, user attributes, and/or other suitable attributes also can be passed to the one or more classifiers 108. In the illustrated embodiment, an ensemble classifier 112 can receive the outputs from the one or more classifiers 108 and apply an ensemble model to the outputs to generate an overall behavioral threat score of the monitored activity.

As shown in FIG. 4A, the method can include receiving telemetry regarding actions detected over a selected temporal window or time period (e.g., an hour or any suitable time window) at 202 in the one or more client systems being monitored. In embodiments, the telemetry from the one or more client systems can include network/DNS/URL logs, process logs, file logs, kernel logs, memory logs, authentication logs, intrusion detection system logs, anti-virus/malware logs, registry logs, other suitable system logs, and/or other suitable information (e.g., the inputs 102 of FIG. 3) with associated timestamps. While a number of different inputs 102 are included in FIG. 3, any combination of the listed inputs 102 or other inputs could be included or could be omitted without departing from the disclosure. In exemplary embodiments, the system logs can include command line inputs and/or other data that can be made by automated systems (e.g., scripts that may be used by system administrators or other authorized users) or can be made by hands-on-keyboard activity (e.g., by an active human user of the client system). Such hands-on-keyboard activity may be associated with the authorized use of the monitored client system or could be associated with unauthorized and/or malicious activity. In this embodiment, the system and method are configured to try to distinguish unauthorized and/or malicious hands-on-keyboard activity from other observed activities.

In the illustrated embodiment, potentially malicious and/or unauthorized hands-on-keyboard activity can be detected amongst the noise (e.g., authorized activities by human actors and/or automated systems) by inputting the telemetry collected over a selected temporal window or time period through a feature extraction engine (e.g., the log feature extractor 104 of FIG. 3) at 204. The feature extraction engine can develop/extract partial values/attributes of the telemetry and tokenize these values/attributes. For example, the feature extraction engine can decompose partial values and attributes of various telemetry, such as processes, network connections, domain names, URLs, files/scripts/macros and operations thereon, terminal commands, kernel objects, named pipes, event tracings, module/library loads, thread injections, system/hypervisor calls, memory analysis, scheduled tasks, shortcuts, service names, registry keys, digital certificates, authentication events, and/or other suitable values/attributes, each associated with a respective timestamp. In embodiments, these values/attributes can be tokenized based on a historical corpus (i.e. labeled examples) of malicious and/or benign activity. For example, the feature extraction engine could identify information in the telemetry that may be idiosyncratic of a threat actor, such as the use of a file name, use of a domain name or IP address, use of certain commands or system administration tools, the repetitive tactic of appending additional content to pre-existing files, executing multiple commands at once or in sequence, particular timings or jitter between events, and/or other values that have been used in prior attacks. Such idiosyncrasies, by themselves, may not be sufficiently distinctive or may be too common to develop a signature (i.e., any single attribute that, by itself, can indicate malicious activity with high fidelity). However, an accumulation and/or pattern of these behavioral idiosyncrasies (e.g., a certain token is used with an abnormal frequency during the selected temporal window or time period and/or certain tokens used in an abnormal combination) can be indicative of an attack.

In embodiments, the historical corpus of malicious and benign activity can be associated with multiple client systems, one or more specific client systems, or a combination of both. For example, it may be abnormal for a certain term to be capitalized in a particular client system, and an instance of the term being capitalized in the system logs could be tokenized. Such a token may be indicative of a particular threat actor along with other behavioral idiosyncrasies and/or other information or may be benign. In other client systems, variations in the use of capitalization of terms in the system logs may be normal and would not be indicative of threat activity.

As indicated at 206 in FIG. 4A, at least a portion of the plurality of tokens output from the feature extraction engine optionally can be fed through a hashing algorithm (or multiple hashing algorithms). In exemplary embodiments, the hashing algorithm can have constrained output dimensionality configured for artificially creating collisions between the hash outputs, whose collisions can be used by one or more of the machine subsystems 108 downstream in the method to learn denser representations of their input feature space. For example, certain tokens or types of tokens may be unique or too rare (e.g., randomly generated file names) to spend system resources on for review (e.g., memory, computation time, etc.). Such unique or rare tokens and/or values/attributes that were tokenized because they were idiosyncratic, but that were not represented in the historical corpus, can be run through a hashing algorithm to reduce the system resources needed to track the unique/rare idiosyncrasies (e.g., the resultant hashes may use less system memory). A hash can be applied to any suitable token without departing from the disclosure. In embodiments, the hashing algorithm can help process large amounts of data by forcing the tokens into groups, which may collide and/or overlap in ways that may indicate benign or malicious activities in the machine learning subsystems 108. In the illustrated embodiment, the hashing algorithm is optional and can be applied to some, all, or none of the tokens at 206.

As an alternative approach to dimensionality reduction, the plurality of tokens optionally may be embedded into a finite-dimensional numeric vector representation as indicated at 207 in FIG. 4A. Such an embedding function may be referred to as Word2Vec or more generally as Token2Vec or Sequence2Vec. This conversion process itself may be entirely trained on tokens of the same type that will be used to characterize or it may be cross-trained from other genres, where pre-existing models can be adapted to this task. In either case, it is often necessary to tailor this conversion process to the type of tokens on which it will be used, such as processes, network connections, domain names, URLs, files/scripts/macros and operations thereon, terminal commands, kernel objects, named pipes, event tracings, module/library loads, thread injections, system/hypervisor calls, memory analysis, scheduled tasks, shortcuts, service names, registry keys, digital certificates, authentication events, and various other information user or system-related telemetry.

Thereafter, at 208, the plurality of tokens output from the feature extraction engine and/or the hashed tokens and/or their vector representation output can be aggregated over the selected time window for each client system and/or each user encountered by the temporal aggregator and analyzer 106, for example, for developing an aggregate feature vector. The aggregate feature vector can include relevant statistics, such as raw counts of the different tokens, the number of raw events for each type of token/data in the time window, and information about the inter-arrival timings of the events (e.g., time statistics about the time intervals between events) for each client system. In an exemplary embodiment, such information can be used by one or more of the machine learning subsystems 108 to differentiate automated behavior by other systems and agents from manual hands-on-keyboard activity. For example, a human actor may take longer between commands than an automated system or a certain token that is present a large number of times in the time window may indicate that that token is associated with a script as part of normal activity in the client system.

As indicated at 210, additional attributes (such as one or more attributes 110 shown in FIG. 3) can be added to the aggregate feature vector or otherwise associated with the aggregate feature vector. Alternatively, the additional attributes can be added directly to the machine learning subsystems 108 along with or separate from the aggregate feature vector. For example, and without limitation, such additional information can include software attributes such as the names and versions of programs installed on the client system, the operating system, updates to the software and/or operating system, installation of new programs, the services running on the client system, startup items that are enabled, anti-virus software in use, firewall configuration, status of disk encryption, etc. The additional attributes also can include hardware attributes of the client system such as the processor types, number of cores, amount of memory, connected peripherals, network interfaces and settings, which ports are open and listening, Wi-Fi status, changes to the hardware attributes (e.g., the addition of a storage device), etc. Further, user attributes can be included, such as group membership, level of privileges, login frequency, time elapsed since last password change, multi-factor authentication status, changes to the user attributes (e.g., a change in the user's privileges) customer, or institution type (e.g., a bank, manufacturer, distributor, etc. . . . ), and/or other attributes. In some embodiments, a hashing algorithm or embedding function can be applied to some or all of the additional attributes before they are included in the aggregate feature vector.

Subsequently, at 212, the aggregate feature vector and the optional additional attributes 110 can be submitted to a series of machine learning subsystems (e.g., the one or more machine learning classifiers 108 shown in FIG. 3). In exemplary embodiments, the machine learning subsystems can be configured to distinguish malicious activity from benign activity, to characterize activities as automated or derived from human behavior, and/or to detect anomalies. The subsystems can use statistical analysis as well as classification or regression algorithms. In embodiments, the subsystems will include at least one supervised machine learning system to distinguish between malicious activity and benign activity, which can be significantly more prevalent. Other subsystems can include generative modeling of inter-arrival times to characterize the associated activities as automated or derived from human behavior. Alternatively, deep neural networks or other models may be used to jointly model both the tokens and the temporal characteristics of the hands-on-keyboard activity. For example, a single end-to-end deep neural network can be operated to jointly model both the tokens of the telemetry as well as the software, hardware, user, and temporal attributes of the client system to predict an overall behavioral threat score. Alternatively, any suitable number of subsystems can model any suitable combination of the tokens and attributes of the client system without departing from the disclosure.

In some embodiments, anomaly detection subsystems can be included for additional characterization of the feature vector to determine the degree to which a particular user or client system is unusual with respect to its peers. For example, it may be normal for a manufacturing company's system to have connections with a particular country while connections with the same country would be abnormal for a banking client's system. Other machine learning subsystems can be optimized to detect suspicious hardware attributes, software attributes, user attributes, and/or other aspects of the aggregate feature vector, to detect different types of threat actors and/or different methods of attack, and/or to use different classification strategies. In some embodiments, all of the machine learning subsystems can be optimized to review different aspects of the aggregate feature vector.

Alternatively, at least a portion of the machine learning subsystems can have overlapping specialties. In exemplary embodiments, the classification subsystems can include naive Bayes classifiers, support vector machines, random forests, gradient boosted trees, deep neural networks, and/or other suitable techniques. In some embodiments, it may be desired to include more flexible subsystems that seek to predict a numeric output, such as the financial risk associated with the observed behavior. For example, such subsystems could include regression analysis, linear regression, logistic regression, generalized linear modeling, generalized additive modeling, nonlinear regression, and/or other suitable techniques. In these embodiments, the machine learning subsystems can be configured to run in parallel. In the illustrated embodiment, any suitable number of machine learning subsystems can be used.

Thereafter, at 214, the output of each of the machine learning subsystems can be fed to an ensemble classification system or regression model trained with an additional and/or different corpus of examples of malicious and/or benign activities and configured to generate an overall behavioral threat score. For example, the threat score can include a confidence value and/or a severity value. In some embodiments, the ensemble classifier can provide an indication that the actor is or is not an insider threat, a financially motivated criminal, a nation-state actor, etc. in addition or alternatively to the confidence and/or severity of such a determination. Accordingly, the machine learning subsystems can flag respective aspects of the aggregate feature vector as benign or malicious and the ensemble classifier can output the threat score based on the outputs (e.g., preliminary threat scores) from the machine learning subsystems. For example, one machine learning subsystem may flag changes in hardware attributes as being suspicious, while other machine learning subsystems indicate no malicious activity, and the ensemble classifier may develop a low threat score, accordingly.

Alternatively, the combined outputs of the machine learning subsystems may lead to a higher behavioral threat score from the ensemble classifier if a number of the machine learning subsystems flag suspicious activity. In some embodiments, the outputs from some of the machine learning subsystems can be weighted by the ensemble classifier. For example, aspects of the aggregate feature vector that are flagged as suspicious by a particular machine learning subsystem may have a high probability of indicating malicious activity in the networked system, and the ensemble classifier can give more weight to the output from this machine learning subsystem or can stop the analysis and take action (e.g., generate an alarm and/or take remedial action).

As shown in FIG. 4B, if the behavioral threat score output from the ensemble classifier is above a predetermined threshold value (at 216), the threat detection system can take appropriate action. For example, an alarm can be activated to alert security analysts to the potential threat and/or the threat detection system can take remediating action (e.g., to limit or eliminate the threat) and/or preventative action can be taken for addressing the threat (at 218). Otherwise, if the behavioral threat score is not above the predetermined value, as noted at 216, and if the behavioral threat score is below a predetermined value, as indicated at 220, the threat detection system determines that the user and/or system is not a current threat (at 222). In embodiments, the user/system will continue to be analyzed in the future to detect any subsequent use by unauthorized actors.

In the case that the behavioral threat score is between the upper and lower predetermined values (at 216, 220), the threat detection system can adjust and/or expand the time window for the tokenized data reviewed by the threat detection system (at 224) so that additional telemetry and/or hashes and/or embedded notations or indications of telemetry can be analyzed for the particular user/system. For example, the adjusted and/or expanded time window can be applied to step 208 with the process continuing from 208. It is also possible that more complex or computationally expensive models can be used to evaluate feature vectors that initially score between the upper and lower predetermined values. It further will be understood that the actions indicated at 202 to 224 may be rearranged or omitted and other actions or steps may be included, without departing from the scope of the present disclosure.

In some streaming real-time embodiments, the time window can be updated for the machine learning classifiers, etc. For example, more recent events can be added to the aggregate feature vector while older events age out and are removed from the aggregate feature vector as the time window shifts forward. The continually updating aggregate feature vector can be fed through the machine learning subsystems and then the ensemble classifier to produce updated behavioral threat scores. For example, the machine learning subsystems can be operated in real-time by removing old tokens from the aggregate feature vector and incorporating new tokens into the aggregate feature vector as time passes.

Figure 5:
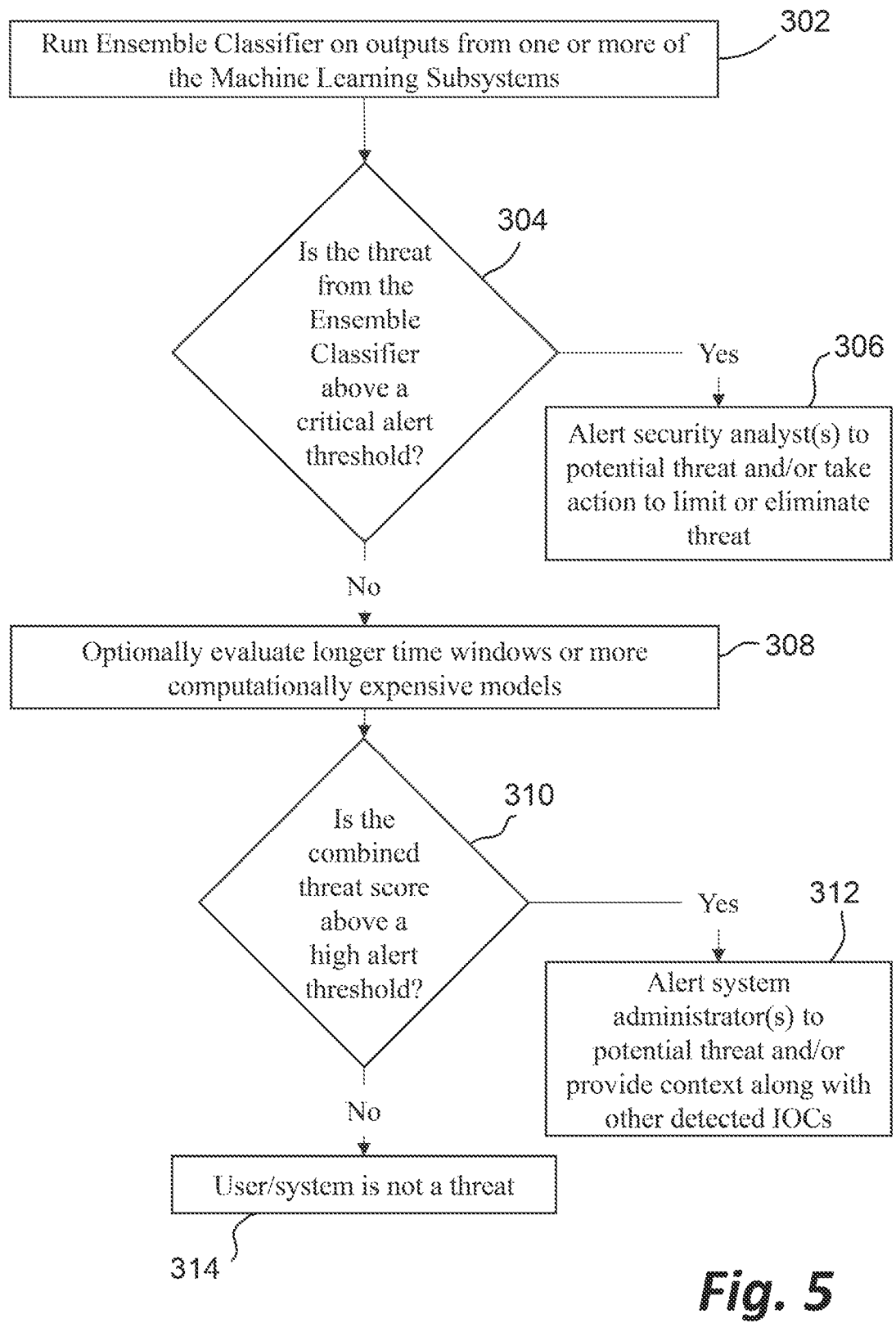
FIG. 5 shows an example flow diagram for an exemplary ensemble classifier process according to another aspect of the present disclosure.

As shown in FIG. 5, the aggregate feature vector is first run through one or more of the machine learning subsystems. After the results of the initial machine learning subsystem have been calculated, their output can be fed to the ensemble classifier (at 302), which can determine if the overall behavioral threat score is above a critical alert threshold (at 304). In the case that this behavioral threat score is above the predetermined critical alert threshold, the endpoint and extended detection and response system can alert security analysts to a potential threat and/or automatically take remediating and/or preventative action (at 306). Alternatively, in the case that this behavioral threat score is below the critical alert threshold, but above a high alert threshold, the system can adjust the time windows and/or gather additional information and/or make use of more computationally expensive models (at 308). This is especially useful in streaming embodiments where models capable of operating in real-time can be used to filter out the majority of benign data and a minority of potentially suspicious data can be fed through more complex and computationally expensive models. If the combined behavioral threat score is below the high alert threshold at (310), the feature vector can be safely discarded (at 314). If the combined behavioral threat score is above the high alert threshold (at 310), system administrator(s) can be alerted to a potential threat and/or provided with context along with other detected IOCs (at 312).

Figure 6:
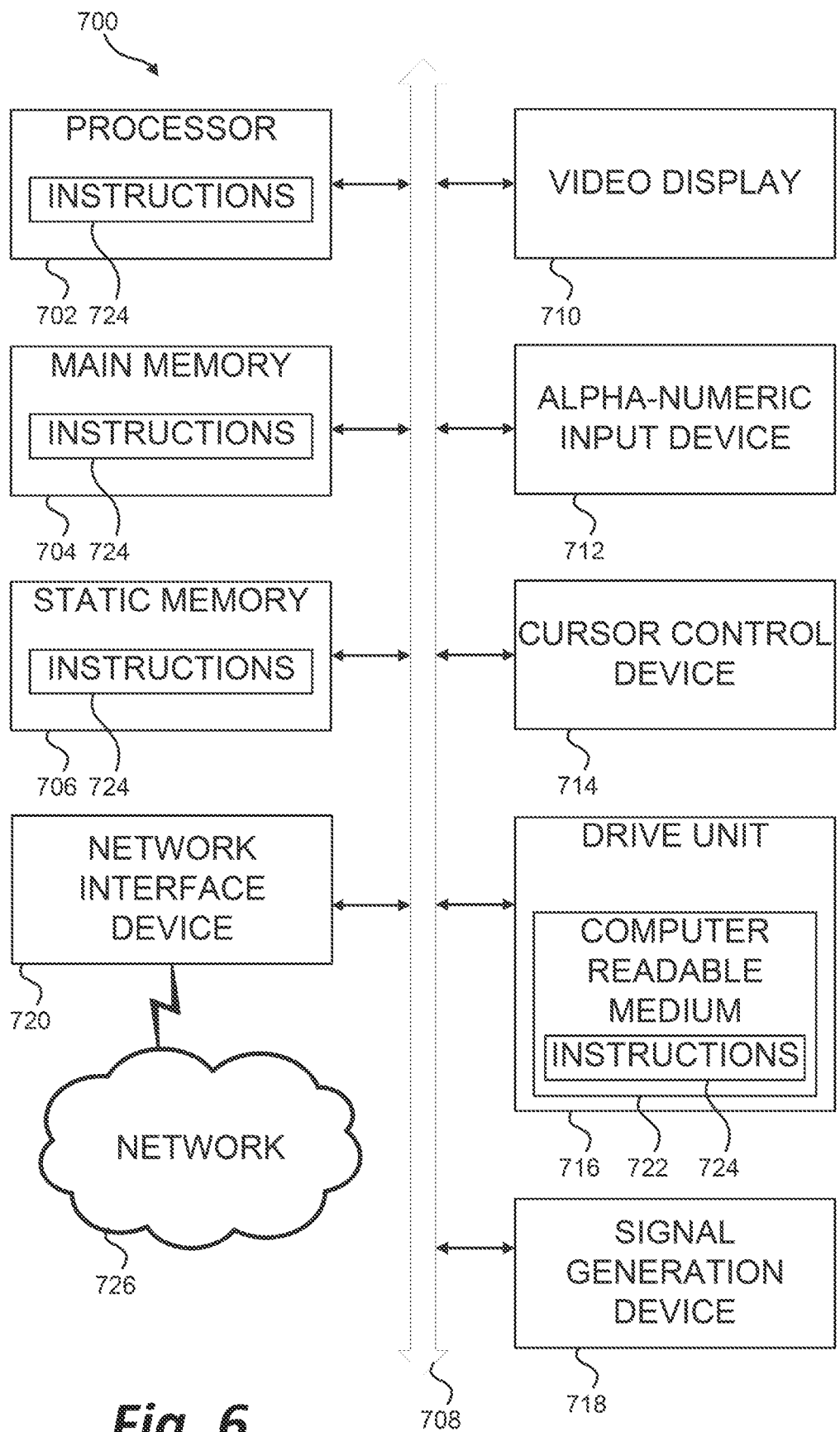
FIG. 6 shows an exemplary information handling system according to one aspect of the present disclosure.

FIG. 6 shows an example of an information handling system 700 capable of administering each of the specific embodiments of the present disclosure. The information handling system 700 can represent the user information handling systems 22, 32, and 40 of FIGS. 1 and 2, and/or other information handling systems included in or otherwise in communication with the data center 13 and/or the networked systems 12. The information handling system 700 may include a computer system or processor 702 such as a central processing unit (CPU), a graphics processing unit (GPU), or both. Moreover, the information handling system 700 can include a main memory 704 and a static memory 706 that can communicate with each other via a bus 708. The information handling system 700 includes a near-field communications (NFC) device and interface 718, such as an antenna and NFC subsystem. The information handling system 700 can also include a disk drive unit 716, and a network interface device 720.

As shown, the information handling system 700 further may include a video display unit 710, such as a liquid crystal display (LCD), an organic light emitting diode (OLED), a flat panel display, a solid state display, or a cathode ray tube (CRT), or other suitable display. The video display unit 710 may also act as an input accepting touchscreen inputs. Additionally, the information handling system 700 may include an input device 712, such as a keyboard, or a cursor control device, such as a mouse or touch pad, or a selectable interface on the display unit. Information handling system may include a battery system 714. The information handling system 700 can represent a device capable of telecommunications and whose can be share resources, voice communications, and data communications among multiple devices. The information handling system 700 can also represent a server device whose resources can be shared by multiple client devices, or it can represent an individual client device, such as a laptop or tablet personal computer, and/or any other suitable device without departing from the scope of the present disclosure.

The information handling system 700 can include a set of instructions that can be executed to cause the processor to perform any one or more of the methods or computer based functions disclosed herein. The processor 702 may operate as a standalone device or may be connected such as using a network, to other computer systems or peripheral devices.

In a networked deployment, the information handling system 700 may operate in the capacity of a server or as a client information handling device in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or subsystems that individually or jointly execute a set, or multiple sets, of instructions to perform one or more computer functions.

The disk drive unit 716 or static memory 714 may include a computer-readable medium 722 in which one or more sets of instructions 724 such as software can be embedded. The disk drive unit 716 or static memory 706 also contains space for data storage. Further, the instructions 724 may embody one or more of the methods or logic as described herein. In a particular embodiment, the instructions 724 may reside completely, or at least partially, within the main memory 704, the static memory 706, and/or within the processor 702 during execution by the information handling system 700. The main memory 704 and the processor 702 also may include computer-readable media. The network interface device 720 can provide connectivity to a network 726, e.g., a wide area network (WAN), a local area network (LAN), wireless network, or other network. The network interface device 720 may also interface with macrocellular networks including wireless telecommunications networks such as those characterized as 2G, 3G, 4G, 5G, LTE or similar wireless telecommunications networks similar to those described above. The network interface 720 may be a wireless adapter having antenna systems for various wireless connectivity and radio frequency subsystems for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 726 can communicate voice, video, or data or other information data over the network 726. Further, the instructions 724 may be transmitted or received over the network 726 via the network interface device 720. In a particular embodiment, BIOS/FW code 724 reside in memory 704, and include machine-executable code that is executed by processor 702 to perform various functions of information handling system 700.

Information handling system 700 includes one or more application programs 724, and Basic Input/Output System and Firmware (BIOS/FW) code 724. BIOS/FW code 724 functions to initialize information handling system 700 on power up, to launch an operating system, and to manage input and output interactions between the operating system and the other elements of information handling system 700.

In another embodiment (not illustrated), application programs and BIOS/FW code reside in another storage medium of information handling system 700. For example, application programs and BIOS/FW code can reside in drive 716, in a ROM (not illustrated) associated with information handling system 700, in an option-ROM (not illustrated) associated with various devices of information handling system 700, in storage system 706, in a storage system (not illustrated) associated with network channel 720, in another storage medium of the information handling system 700, or a combination thereof. Application programs 724 and BIOS/FW code 724 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile, read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A method for detecting unauthorized and/or malicious hands-on-keyboard activity in an information handling system, the method comprising:
   receiving telemetry from one or more client systems;
   tokenizing a plurality of idiosyncrasies detected in the telemetry based on examples of malicious hands-on keyboard activity to form a plurality of tokens;
   aggregating the plurality of tokens over a selected time window to at least partially develop an aggregate feature vector;
   submitting the aggregate feature vector to one or more machine learning subsystems trained on a historical corpus of malicious hands-on keyboard activities and benign hands-on keyboard activities; and
   applying an ensemble model to one or more outputs from the one or more machine learning subsystems to generate an overall behavioral threat score of the hands-on-keyboard activity trained on another corpus of malicious hands-on keyboard activities and benign hands-on keyboard activities.

2. The method of claim 1, further comprises applying a hashing algorithm to at least a portion of the plurality of tokens and outputting a plurality of hashes for the tokens, wherein similar tokens are grouped together in the plurality of hashes.

3. The method of claim 1, further comprising embedding at least a portion of the plurality of tokens into a finite-dimensional numeric vector using at least one neural network that is trained on a large corpus of tokens.

4. The method of claim 1, wherein the aggregating the plurality of tokens over the selected time window comprises aggregating raw counts of previously detected idiosyncrasies and selected statistics of respective types of tokens of the plurality of tokens for each of the one or more client systems.

5. The method of claim 4, wherein the statistics comprise at least one of raw counts of the respective types of tokens, a number of events for respective types of tokens, and time statistics about time intervals between the events.

6. The method of claim 1, further comprising incorporating one or more attributes of the one or more client systems into the aggregate feature vector, wherein the one or more attributes comprises at least one of temporal attributes, software attributes, operating system attributes, hardware attributes, user attributes, and combinations thereof.

7. The method of claim 1, wherein the one or more machine learning subsystems include at least one of statistical analysis subsystems, classifications subsystems, and regression subsystems.

8. The method of claim 1, wherein the one or more machine learning subsystems utilize supervised machine learning to distinguish malicious activities from benign activities.

9. The method of claim 1, wherein the one or more machine learning subsystems model is configured to review inter-arrival times between events in the telemetry for characterizing the events as automated or derived from human behavior.

10. The method of claim 1, wherein the one or more machine learning subsystems utilize anomaly detection for determining how unusual a user or client system is relative to its peers.

11. The method of claim 1, further comprising operating the one or more machine learning subsystems in real-time by removing one or more old tokens from the aggregate feature vector and incorporating new tokens into the aggregate feature vector as time passes.

12. The method of claim 11, further comprising submitting the aggregate feature vector to one or more additional machine learning subsystems if the overall behavioral threat score meets a predetermined threshold, wherein the one or more additional machine learning subsystems are more computationally expensive than the one or more machine learning subsystems.

13. The method of claim 1, further comprising comparing the overall behavioral threat score to predetermined threshold values and initiating a responsive action including at least one of alerting security analysts of a security threat, indicating that the client system is free of attacks, and revising the selected time window and updating the aggregate feature vector with additional tokens from the telemetry.

14. The method of claim 1, further comprising operating a single end-to-end deep neural network to jointly model both the plurality of tokens of the telemetry as well as software, hardware, user, and temporal attributes of the one or more client systems to predict the overall behavioral threat score.

15. A system for monitoring hands-on keyboard activity and detecting unauthorized and/or malicious hands-on-keyboard activity, the system comprising:
   one or more storage media for storing telemetry from one or more information handling systems;
   at least one processor programmed to execute instructions stored in a memory and operable to:
   collect telemetry corresponding to the monitored hands-on keyboard activity from the one or more information handling systems;
   tokenize a plurality of features included in the telemetry based on examples of malicious hands-on keyboard activity to form a plurality of tokens;

aggregate the plurality of tokens over a selected time window to at least partially develop an aggregate feature vector;

submit the aggregate feature vector to one or more machine learning subsystems trained on a historical corpus of malicious hands-on keyboard activities and benign hands-on keyboard activities; and apply an ensemble model to one or more outputs from the one or more machine learning subsystems to generate an overall behavioral threat score of the hands-on-keyboard activity trained on another corpus of malicious hands-on keyboard activities and benign hands-on keyboard activities.

16. The system of claim 15, wherein the processor is further operable to apply a hashing algorithm to at least a portion of the plurality of tokens and output a plurality of hashes for the tokens, wherein similar tokens are grouped together in the plurality of hashes.

17. The system of claim 15, wherein the processor is further operable to embed at least a portion of the plurality of tokens into a finite-dimensional numeric vector using at least one neural network that is trained on a large corpus of tokens.

18. The system of claim 15, wherein aggregating the plurality of tokens over the selected time window comprises aggregating raw counts of previously detected features and selected statistics of respective types of tokens of the plurality of tokens for one or more client systems.

19. The system of claim 18, wherein the statistics comprise at least one of raw counts of the respective types of tokens, a number of events for respective types of tokens, and time statistics about time intervals between the events.

20. The system of claim 15, wherein the processor is further operable to incorporate one or more attributes of one or more client systems into the aggregate feature vector, and wherein the one or more attributes comprises at least one of temporal attributes, software attributes, operating system attributes, hardware attributes, user attributes, and combinations thereof.

21. The system of claim 15, wherein the one or more machine learning subsystems include at least one of statistical analysis subsystems, classifications subsystems, and regression subsystems.

22. The system of claim 15, wherein the one or more machine learning subsystems utilize supervised machine learning to distinguish malicious activities from benign activities.

23. The system of claim 15, wherein the one or more machine learning subsystems utilize generative modeling of inter-arrival times between events in the telemetry for characterizing the events as automated or derived from human behavior.

24. The system of claim 15, wherein the one or more machine learning subsystems utilize anomaly detection for determining how unusual a user or client system is relative to its peers.

25. The system of claim 15, wherein the processor is further operable to compare the overall behavioral threat score to predetermined threshold values and initiate a responsive action including at least one of alerting security analysts of a security threat, indicating that client system is free of attacks, and revising the selected time window and updating the aggregate feature vector with additional tokens from the telemetry.

26. The system of claim 15, wherein the processor is further operable to execute a single end-to-end deep neural network to jointly model both the plurality of tokens of the telemetry as well as software, hardware, user, and temporal attributes of one or more information handling systems to predict the overall behavioral threat score.

27. The system of claim 15, wherein the plurality of features includes one or more of use of a file name, use of a domain name or IP address, use of selected commands, use of selected system administration tools, appending additional content to pre-existing files, executing multiple commands at once or in sequence, jitter between events, misuse of selected terms, or other values that have been used in prior attacks.

* * * * *